(12) United States Patent
Scheibe (10) Patent No.: US 8,165,808 B2
(45) Date of Patent: Apr. 24, 2012

(54) TECHNIQUES FOR REPRESENTING LOCATION INFORMATION

(75) Inventor: Bernd Scheibe, Hamburg (DE)

(73) Assignee: Yahoo! Inc., Sunnyvale, CA (US)

( * ) Notice: Subject to any disclaimer, the term of this patent is extended or adjusted under 35 U.S.C. 154(b) by 1018 days.

(21) Appl. No.: 11/879,626

(22) Filed: Jul. 17, 2007

(65) Prior Publication Data
US 2009/0024315 A1    Jan. 22, 2009

(51) Int. Cl.
G01C 21/34    (2006.01)
G08G 1/123   (2006.01)
G09G 5/00    (2006.01)

(52) U.S. Cl. ........... 701/533; 340/995.1; 340/995.24; 345/581; 345/617

(58) Field of Classification Search .......... 701/200–226, 701/408–411, 428, 432, 438, 426.429, 533; 340/988–996, 995.1–995.28; 345/581, 617
See application file for complete search history.

(56) References Cited

U.S. PATENT DOCUMENTS

| | | | |
|---|---|---|---|
| 7,076,741 B2 * | 7/2006 | Miyaki | 715/837 |
| 2003/0139150 A1 * | 7/2003 | Rodriguez et al. | 455/90 |
| 2004/0243307 A1 * | 12/2004 | Geelen | 701/213 |
| 2006/0199612 A1 * | 9/2006 | Beyer et al. | 455/556.2 |
| 2008/0140309 A1 * | 6/2008 | Jendbro | 701/202 |

OTHER PUBLICATIONS

Google Map, map view, Feb. 2007.*
Grand-central-station,ny.*
JFK-GrandCentral.*
Google Map, map view, Feb. 2007 (Google Traffic Info).*

* cited by examiner

*Primary Examiner* — James Trammell
*Assistant Examiner* — Muhammad Shafi
(74) *Attorney, Agent, or Firm* — Weaver Austin Villeneuve and Sampson LLP (57) ABSTRACT

Methods and apparatus are described for representing points of interest relative to a user-defined geographic area in a map interface. Representation of the geographic area and a plurality of point-of-interest (POI) locations corresponding to the points of interest is facilitated in the map interface using a color scheme in which variations in color represent variations in density of the POI locations within the geographic area.

18 Claims, 6 Drawing Sheets
(4 of 6 Drawing Sheet(s) Filed in Color)

TECHNIQUES FOR REPRESENTING LOCATION INFORMATION

BACKGROUND OF THE INVENTION

The present invention relates to representing points of interest in map interfaces and, in particular, to the use of color schemes to represent the density of points of interest.

Location-related applications employ a variety of techniques to represent points of interest in map interfaces. For example, locations are often represented using various types of icon graphics which may be accompanied by text representing the type or even the name of the corresponding location. Alternatively, locations may be represented in a list ordered by their respective distance from a particular location. Unfortunately, such conventional representations have inherent limitations depending, for example, on the scope of the geographic area represented (e.g., the map magnification or zoom level), or the size of the display on which the information is presented For example, if a user of a mobile device wants to see all of the Italian restaurants in New York City, conventional techniques would clearly be inadequate for representing the hundreds (if not thousands) of locations in the five boroughs, particularly on the relatively small display of a typical mobile device. Either the icons presented would completely obscure the map on which they are overlaid, or the list of locations would be far too long to scroll through. While this may be an extreme example, it serves to dramatically illustrate the limitations of conventional techniques. And even in cases where there are only 15 or 20 locations, the limitations of such approaches are well understood.

SUMMARY OF THE INVENTION

According to the present invention, methods and apparatus are provided for representing points of interest relative to a user-defined geographic area in a map interface. Representation of the geographic area and a plurality of point-of-interest (POI) locations corresponding to the points of interest is facilitated in the map interface using a color scheme in which variations in color represent variations in density of the POI locations within the geographic area.

A further understanding of the nature and advantages of the present invention may be realized by reference to the remaining portions of the specification and the drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

FIGS. 2a-6 are examples of map interfaces in which location information is presented in accordance with various specific embodiments of the invention.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention provide a variety of techniques for representing points of interest in map interfaces. As used herein, the term "point of interest" refers to any fixed or dynamic location which may be depicted in a map interface and may correspond, for example and without limitation, to a business establishment, a tourist attraction, a landmark, a person or other entity, user-generated content (e.g., geotagged photos, comments or reviews of particular establishments, etc.), a geocache, coupons, local promotions, etc. Such map interfaces may be presented on displays associated with a wide variety of devices including, for example and without limitation, desktop and laptop computers, handheld computing devices, mobile communication platforms (e.g., cell phones and email clients), set top boxes, etc. Specific embodiments of the invention will now be described with reference to the accompanying drawings.

In at least some of the following examples, it is assumed that the user to which the examples refer is a member of an online community such as, for example, Yahoo! Such examples are useful in that they may be used to illustrate extensions of the invention not enabled in some contexts. However, it should be noted that the present invention encompasses presentation of location information in a wide variety of contexts, and that, in general, any mapping-related or location-based application may be enhanced in accordance with embodiments of the invention.

Figure 1:
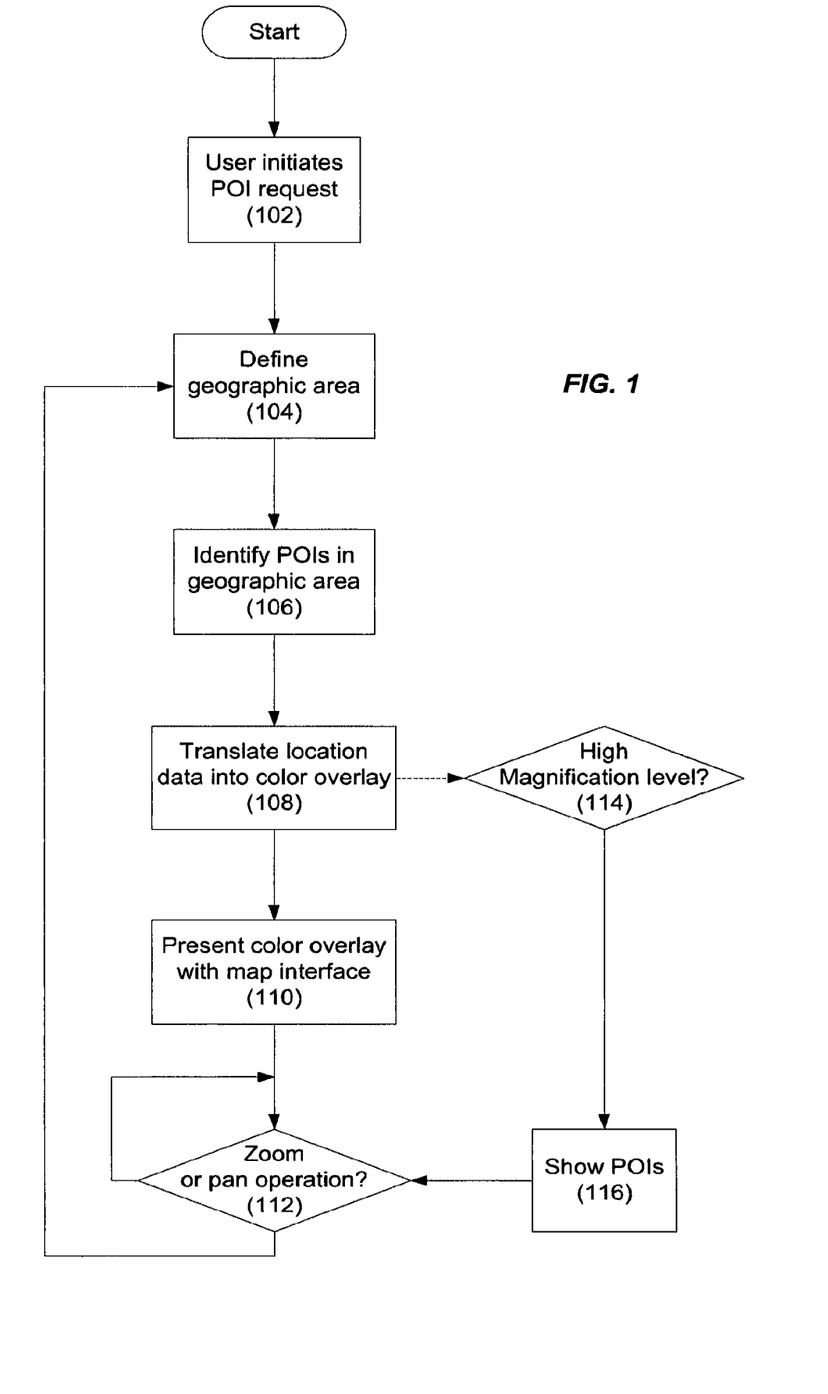
FIG. 1 is a flowchart illustrating operation of a specific embodiment of the invention.

In one example illustrated by the flowchart of FIG. 1, a user of a mobile device (e.g., cell phone, email client, PDA, etc.) initiates a request to identify points of interest within a particular geographic area having certain characteristics (102); in this example, nightlife spots on the island of Manhattan which are highly rated by a select group of Yahoo! users, e.g., his contacts list in Yahoo! Messenger. As an illustration of an embodiment outside of the context of Yahoo!, the quality rating employed to identify the points of interest could come from any of a wide variety of sources which provide such ratings (e.g., Zagat, New York Magazine, The New York Times, Citysearch, etc.).

Upon receiving the request, the back end system (e.g., Yahoo! server(s)) defines the geographic area (104) and identifies suitable points of interest within the geographic area (106). The geographic area may be determined or defined in a variety of ways without departing from the invention. For example, the user could simply specify the region by its geographical name (in this example, Manhattan). Alternatively the geographic area could be determined with reference to a user-defined location such as, for example, the user's current location (e.g., as determined by a GPS location service associated with the user's mobile device, a cell-ID determined by a wireless network, an IP address, etc.), or a location explicitly specified by the user (e.g., an address, an intersection, a zip code, a latitude and longitude, etc.).

Once the suitable points of interest for the geographic area are identified, the back end system translates the location data corresponding to the points of interest into a color overlay for presentation in conjunction with a map interface representing the geographic area (108). According to various embodiments of the invention, the color overlay may be generated using a wide variety of mathematical and algorithmic transformations and according to a wide variety of color schemes to represent the density of the POI locations within the geographic area. Some examples of color schemes which may be employed with various embodiments of the invention are discussed below.

Once generated, the color overlay is presented in conjunction with the map interface on the display of the user's mobile device (110). According to some embodiments, the map interface and color overlay may be generated by the same back end service. Alternatively, the map interface may be generated by one mapping service while the color overlay may be generated by a separate service operating in the network.

Most conventional mapping and location-based applications allow the user to zoom in and out to different levels of "magnification," as well as pan the map image in different directions (i.e., up, down, left, right, diagonally). According to various embodiments of the invention, each time such an operation is executed (112), the color overlay is regenerated relative to the new geographic area and presented accordingly. In addition, if the magnification level is sufficiently high (114), individual icons representing the points of interest may be presented in the map interface either in addition to or instead of the color overlay (116).

That is, if the user zooms into a map level in which only a few (e.g., 5 to 10) of the points of interest are located, then the individual icons may be presented without the disadvantages described above. As will be understood and according to various implementations, the decision as to whether to present individual icons in a given map view may be based on the number of points of interest within the geographic area to be presented in the map interface, and may be decided based on a threshold which is programmable.

Figure 2A:
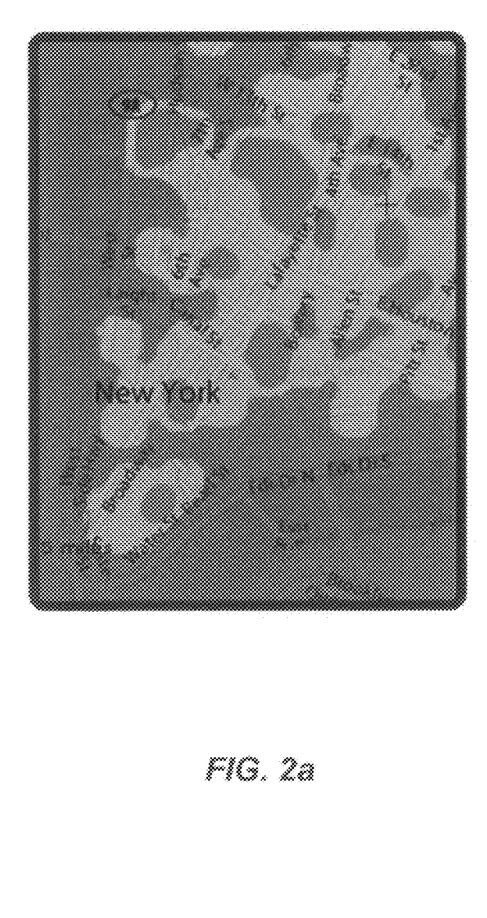
Figure 2B:
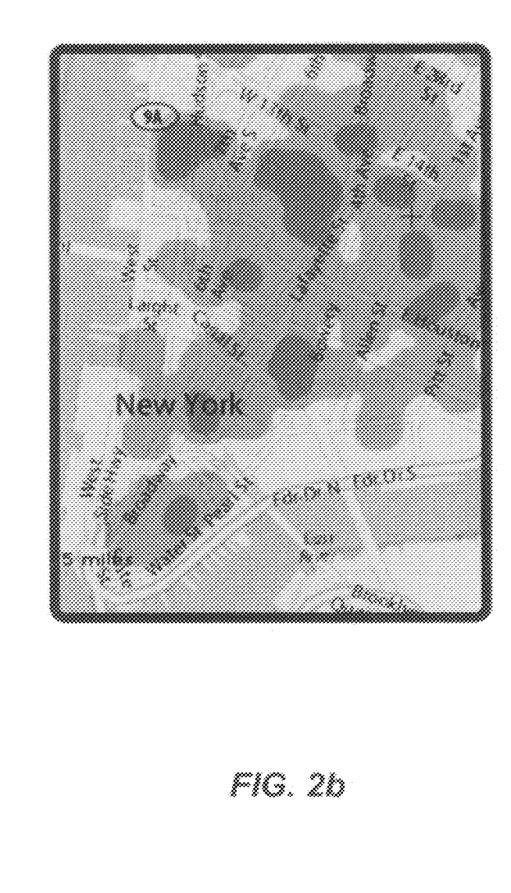

As mentioned above, a wide variety of color schemes may be used in accordance with various embodiments of the invention to represent points of interest in map interfaces. Using the example of nightlife spots on the island of Manhattan, and referring to the map interface shown in FIGS. 2a and 2b, the location information relating to the identified nightlife spots is shown as being represented by a single-color overlay in which the intensity of the color (in this case red) varies with the density of the nightlife spots in a discrete fashion. That is, the color intensity is shown to drop off in discrete steps moving from areas of higher density to areas of lower density. The transitions in such a view are analogous to altitude lines on a topographical map. FIG. 2a depicts an example in which a second color (e.g., blue) overlays areas in which there are no nightlife spots. FIG. 2b shows the entire overlay being of a single color (i.e., varying shades of red).

In this example, large areas of Manhattan (and even the entire island) may be shown in the map interface along with the distribution of points of interest in a manner in which meaningful information is conveyed to the user. This is to be contrasted with conventional approaches in which the number of points of interest would be much too large to present in any meaningful or useful way. This is particularly the case in the present example where the number of nightlife spots in Manhattan is obviously quite large.

As discussed above, the nature of the points of interest being represented by the color overlay may be specified or constrained by the user to select points of interest of particular interest to the user. So, for example, the user might further constrain the current example to nightlife spots which are dance clubs and have at least a certain level of popularity (e.g., as determined by some sort of rating system which may be related in some way to a particular group or community). Thus, the areas of Manhattan in which popular dance clubs are concentrated would be readily discernible by the user simply by looking at the map interface. Some examples of ways in which users may specify or constrain points of interest include a user identifier, a rating, a business type, a POI type, a specific distance from a user-defined location, a particular geographic area, a level of interest (e.g., as indicated by web browsing activity or statistics), or a type of coupon or promotion.

Figure 3A:
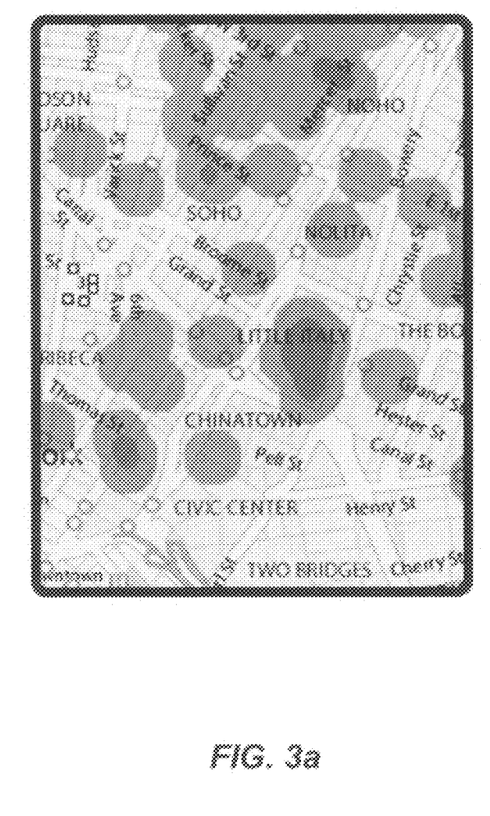
Figure 3B:
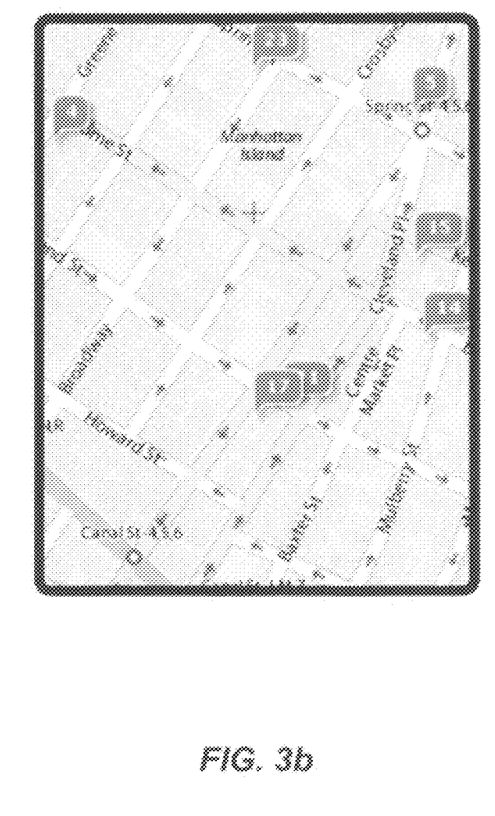

The user could then pan and zoom to areas of interest until the level of magnification is such that individual icons may be used to represent individual points of interest without unduly obscuring the information intended to be conveyed. Examples of successive zoomed-in views are illustrated in the map interfaces of FIGS. 3a and 3b. FIG. 3a shows a zoomed in view centered near Little Italy in which further gradations of location density are represented relative to FIGS. 2a and 2b. FIG. 3b shows a further zoomed in view in which individual numbered icons are used to represent the points of interest. As discussed above, the color overlay may or may not be presented in such a view.

It should be noted that the discretely varying color schemes shown in FIGS. 2a, 2b, and 3a are only examples of how location density may be represented in accordance with embodiments of the invention. In other examples, the color scheme may appear to vary in a more continuous fashion. That is, for example, the color intensity could appear to drop off gradually moving from areas of higher density to areas of lower density.

Moreover, while using a single color to represent a particular set of points of interest may be advantageous in certain implementations as discussed below, embodiments are contemplated in which multiple colors are used to represent variations in location density. For example, the color scheme could vary (e.g., with continuous or discrete appearance) from red (e.g., hot or high concentration) to blue (e.g., cold or low concentration).

And the manner in which the location density information is translated into a color overlay may vary considerable as well without departing from the scope of the invention. For example, the location data for the points of interest may be readily converted to a continuously varying, two-dimensional density function which may then be mapped onto the individual pixels of the map interface accordingly. Alternatively, each point-of-interest location may be assigned a color value which is then plotted on the map interface in an additive manner with other nearby or overlapping points of interest, thus giving the appearance of increased color intensity where the density is higher. To give the appearance of discrete variations in the colors scheme (rather than a continuously varying appearance), values of the density distribution function, or the additive color values could be constrained to only take on discrete values (i.e., intervening values would be rounded up or down to the nearest discrete value). In addition, the number of color gradations could be constrained to a relatively small number (e.g., three to represent high, medium, and low density).

In some embodiments, a threshold for using color could be introduced such that where the values of the density distribution function or the additive color values are below the threshold, the color scheme is eliminated or inhibited in some way, e.g., the native color of the underlying map is used. This could be used to reduce the color "noise" in some implementations, potentially making the represented information more readily discernible.

As described above, embodiments of the invention may be used to represent the density of points of interest of a given type. In addition, one or more additional characteristics of a POI type may be employed to filter, enhance, or emphasize certain aspects of the information being presented. For example, representation of the density of points of interest according to embodiments of the invention can be employed to identify popular areas for a given POI type, e.g., particular neighborhoods, when characteristics such as popularity or quality ratings for that POI type are used in selecting the points of interest. In another example of a characteristic which might be used as a filter, establishments which are wheel-chair accessible, or which are highly rated for accessibility to people with disabilities could be used. In yet another example, nightlife spots which feature a certain type of music or dancing could be emphasized. In still another example, search traffic statistics can be employed to determine measures of popularity or currency (e.g., in a manner analogous to a tag cloud). In a further example, a point of interest might only be selected for representation if it is within some minimum distance from another point of interest of the same or even a different type. More generally, virtually any type of POI characteristic may be taken into account to select the points of interest for representation as described herein.

According to some embodiments, multiple POI types may be represented simultaneously in a color overlay generated in accordance with the invention. Returning to the example of nightlife spots in Manhattan as one of the POI types, an additional POI type which could be represented in the same map interface in which the density of nightlife spots is represented are the current locations of the user's friends. Such locations might be determined, for example, with reference to the current position of mobile devices associated with individuals in the user's contacts list or some other community associated with the user. Any of a variety of location services and applications may be used to derive this information.

Figure 4:
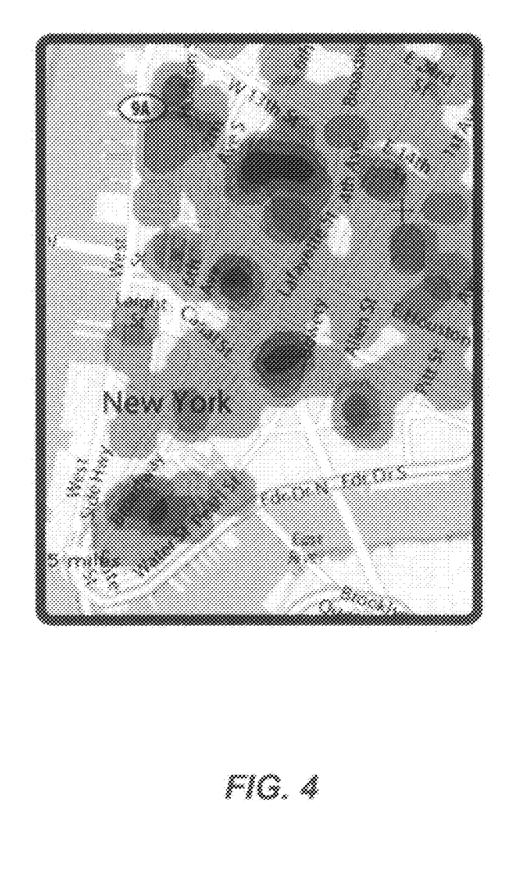
Figure 6:
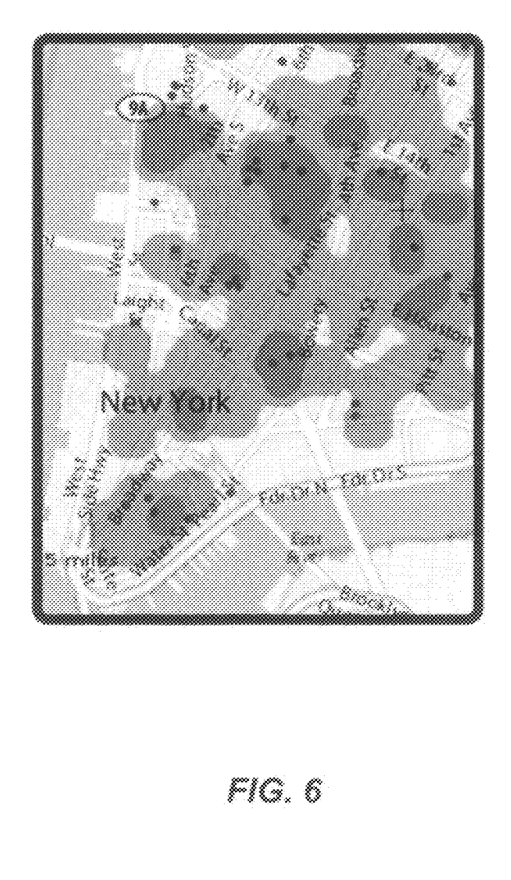

An example of how these two different POI types might be represented is shown in FIG. 4. In this example, the density of Manhattan nightlife spots is again depicted using varying intensity of the color red, while the density of the user's friends is depicted using varying intensity of the color blue. Where the two colors overlap, a third color, e.g., purple, may be shown. In this way, the user can quickly see the intersection of his community with Manhattan nightlife, i.e., the spots or neighborhood in which his friends are currently located. As an alternative to a representation of the density of the user's friends, each friend could simply be represented by a small color indicator (e.g., one or just a few pixels) on top of the varying blue color scheme representing the nightlife spots (e.g., as shown in FIG. 6).

Figure 5A:
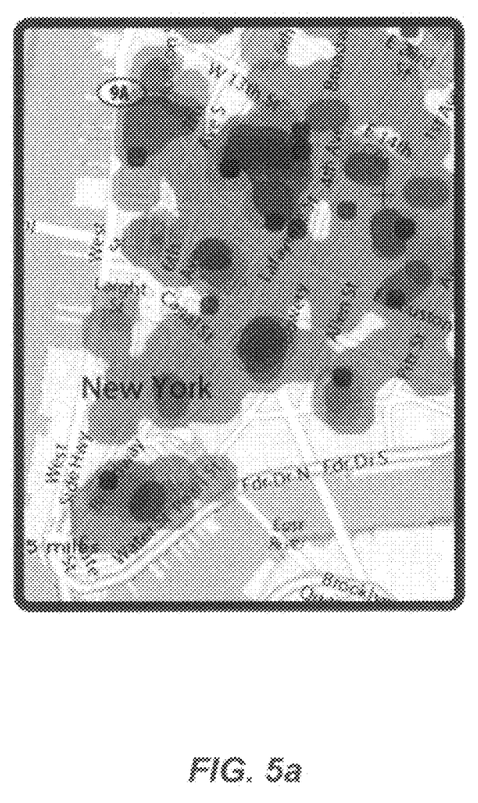

As shown in FIG. 5a, a third POI type, e.g., highly rated restaurants, may be introduced represented by yet another color scheme to represent density, e.g., varying intensity of green. Where the green scheme overlaps with the blue or red scheme, the resulting color could be a blend of the overlapping colors, or an entirely different color. Where all three colors overlap, the resulting color could be a blend or yet another color. Thus, at a single glance, the user could readily determine where he should go if he wants to dine and then experience some nightlife with his friends. In general, any arbitrary number of color overlays (each corresponding to a particular POI type) may be overlaid or blended for representation in a single map interface.

Figure 5B:
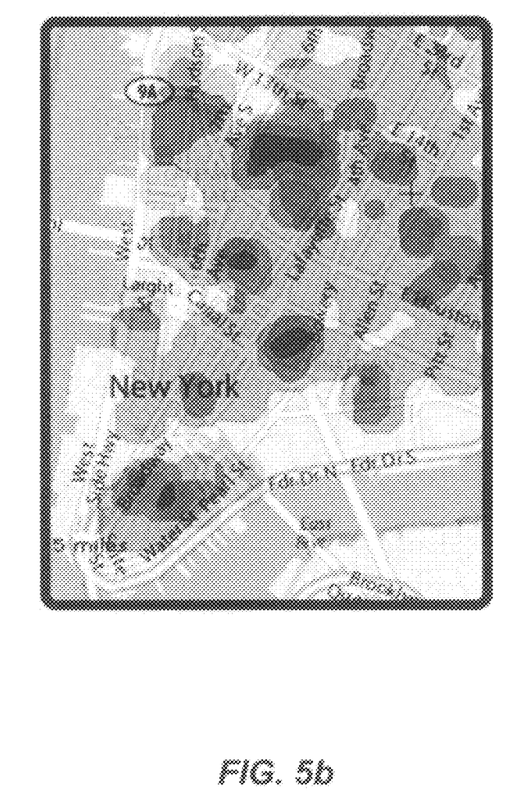

As an alternative to the multi-colored approach illustrated in FIG. 5a, a single-color approach may be used to represent multiple different POI types as illustrated in FIG. 5b. In this illustration, the information presented is the same as that presented in FIG. 5a, with the different regions shown in FIG. 5a being of the same color. In this example, overlapping regions representing different POI types result in an increased intensity in the area of the overlap. Again, at a single glance, the user can see identify the "hot spots," i.e., the areas which correspond to the greatest coincidence among the various POI types.

According to some embodiments, one type of POI and its associated color scheme could be used as a background against which other types of POIs and their color schemes are overlaid. In such an example, a threshold for showing color might not be applied to the background POI, while thresholds would apply for the foreground or overlaid POIs. Returning again to the example of Manhattan nightlife spots and as illustrated in FIG. 6, the red overlay could be the ubiquitous background over which the more constrained overlay of friends (blue) is presented. In the example shown, the overlay corresponding to friends is constrained to show one blue dot for each friend. As will be understood, other types and levels of constraints could be employed.

Figure 7:
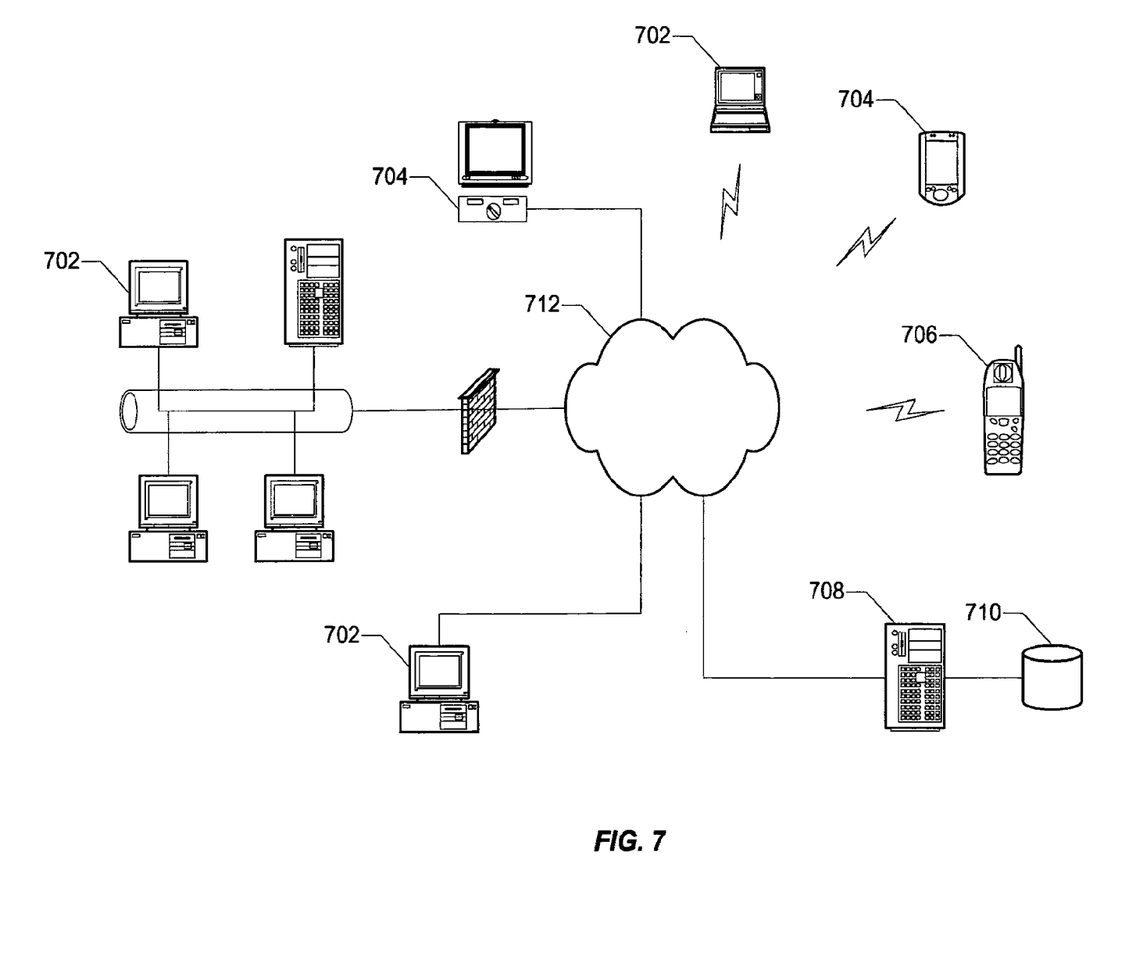
FIG. 7 is a simplified diagram of a network environment in which embodiments of the present invention may be implemented.

It should be noted that the present invention may be implemented on any computing platform(s) and in any network topology, and may be used in any application in which representing location-related information is a useful functionality. For example and as illustrated in FIG. 7, implementations are contemplated in which location-related information and the related functionalities described herein may be presented in interfaces on personal computers 702, media computing platforms 703 (e.g., gaming platforms, or cable and satellite set top boxes with navigation and recording capabilities), handheld computing devices (e.g., PDAs, navigation systems, etc.) 704, cell phones 706, or any other type of portable communication platform.

The logic (e.g., as embodied in computer code or instructions) which controls the various functionalities associated with presentation of the location-related information may be resident on such devices, e.g., as part of a browser or other application, or be served up from a remote site, e.g., in a Web page. The identification of points of interest and generation of the color overlay may be accomplished on one or more platforms (represented by server 708 and data store 710) remote from end user devices. The invention may also be practiced in a wide variety of network environments (represented by network 712), e.g., TCP/IP-based networks, telecommunications networks, wireless networks, cable networks, etc.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. For example, embodiments have been described herein in which a user initiates a request for points of interest in a geographic area in some kind of online mapping service. However, it should be understood that points of interest may be represented using color schemes in any of a wide variety of contexts and mapping applications without departing from the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for representing points of interest relative to a user-defined geographic area in a map interface, comprising using one or more computing devices to facilitate, in a particular zoom level, representation of the geographic area and a plurality of point-of-interest (POI) locations corresponding to the points of interest in the map interface using a color scheme in which variations in color in the particular zoom level represent variations in density of the POI locations within the geographic area, wherein the points of interest correspond to one or more of business establishments, tourist attractions, landmarks, entities associated with a user associated with the user-defined geographic area, geocaches, user generated content, coupons, or local promotions, and wherein the color scheme employs one or more of different intensities of one color to represent the variations in color, or different colors to represent the variations in color.

2. The method of claim 1 wherein the points of interest comprise a plurality of point-of-interest (POI) types, and wherein the color scheme employs a different color for each POI type.

3. The method of claim 2 wherein the color scheme employs additional colors to represent overlapping in the map interface of the different colors corresponding to the POI types.

4. The method of claim 1 further comprising facilitating specification of at least one parameter by a user associated with the user-defined geographic area and with reference to which the POI locations are to be identified, the at least one parameter comprising one or more of a user identifier, a rating, a business type, a POI type, a specific distance from a user-defined location, a level of interest, or a type of coupon.

5. The method of claim 1 further comprising facilitating zooming in and zooming out in the map interface such that, where a zoom magnification is sufficiently high, each of a subset of the POI locations within the zoom magnification is represented in the map interface with a corresponding icon.

6. The method of claim 1 wherein the user-defined geographic area is determined with reference to one or more of a current location of a user, a specified area specified by the user, or a specified location specified by the user.

7. A computer program product for representing points of interest relative to a user-defined geographic area in a map interface, the computer program product comprising at least one non-transitory computer-readable medium having computer program instructions stored therein which, when executed by at least one computing device, cause the at least one computing device to facilitate, in a particular zoom level, representation of the geographic area and a plurality of point-of-interest (POI) locations corresponding to the points of interest in the map interface using a color scheme in which variations in color in the particular zoom level represent variations in density of the POI locations within the geographic area, wherein the points of interest correspond to one or more of business establishments, tourist attractions, landmarks, entities associated with a user associated with the user-defined geographic area, geocaches, user generated content, coupons, or local promotions, and wherein the color scheme employs one or more of different intensities of one color to represent the variations in color, or different colors to represent the variations in color.

8. The computer program product of claim 7 wherein the points of interest comprise a plurality of point-of-interest (POI) types, and wherein the color scheme employs a different color for each POI type.

9. The computer program product of claim 8 wherein the color scheme employs additional colors to represent overlapping in the map interface of the different colors corresponding to the POI types.

10. The computer program product of claim 7 wherein the computer program instructions are further operable to cause the at least one computing device to facilitate specification of at least one parameter by a user associated with the user-defined geographic area and with reference to which the POI locations are to be identified, the at least one parameter comprising one or more of a user identifier, a rating, a business type, a POI type, a specific distance from a user-defined location, a level of interest, or a type of coupon.

11. The computer program product of claim 7 wherein the computer program instructions are further operable to cause the at least one computing device to facilitate zooming in and zooming out in the map interface such that, where a zoom magnification is sufficiently high, each of a subset of the POI locations within the zoom magnification is represented in the map interface with a corresponding icon.

12. The computer program product of claim 7 wherein the user-defined geographic area is determined with reference to one or more of a current location of a user, a specified area specified by the user, or a specified location specified by the user.

13. A computing device configured to represent points of interest relative to a user-defined geographic area, the computing device comprising a display and at least one processor configured to facilitate, in a particular zoom level, representation of the geographic area and a plurality of point-of-interest (POI) locations corresponding to the points of interest in a map interface on the display using a color scheme in which variations in color in the particular zoom level represent variations in density of the POI locations within the geographic area, wherein the points of interest correspond to one or more of business establishments, tourist attractions, landmarks, entities associated with a user associated with the user-defined geographic area, geocaches, user generated content, coupons, or local promotions, and wherein the color scheme employs one or more of different intensities of one color to represent the variations in color, or different colors to represent the variations in color.

14. The computing device of claim 13 wherein the points of interest comprise a plurality of point-of-interest (POI) types, and wherein the color scheme employs a different color for each POI type.

15. The computing device of claim 14 wherein the color scheme employs additional colors to represent overlapping in the map interface of the different colors corresponding to the POI types.

16. The computing device of claim 13 wherein the at least one processor is configured to facilitate specification of at least one parameter by a user associated with the user-defined geographic area and with reference to which the POI locations are to be identified, the at least one parameter comprising one or more of a user identifier, a rating, a business type, a POI type, a specific distance from a user-defined location, a level of interest, or a type of coupon.

17. The computing device of claim 13 wherein the at least one processor is configured to facilitate zooming in and zooming out in the map interface such that, where a zoom magnification is sufficiently high, each of a subset of the POI locations within the zoom magnification is represented in the map interface with a corresponding icon.

18. The computing device of claim 13 wherein the user-defined geographic area is determined with reference to one or more of a current location of a user, a specified area specified by the user, or a specified location specified by the user.

* * * * *